United States Patent
Schmitz et al.

(10) Patent No.: US 10,388,992 B2
(45) Date of Patent: Aug. 20, 2019

(54) ALKYLBENZOATE DERIVATIVES AS ELECTROLYTE ADDITIVE FOR LITHIUM BASED BATTERIES

(71) Applicant: Gotion, Inc., Fremont, CA (US)

(72) Inventors: Rene Schmitz, Mannheim (DE); Diana Fuerst, Ludwigshafen (DE); Lucas Montag, Buerstadt (DE)

(73) Assignee: Gotion Inc., Fremont, CA (US)

( * ) Notice: Subject to any disclaimer, the term of this patent is extended or adjusted under 35 U.S.C. 154(b) by 390 days.

(21) Appl. No.: 15/304,726

(22) PCT Filed: Apr. 8, 2015

(86) PCT No.: PCT/EP2015/057561
§ 371 (c)(1),
(2) Date: Oct. 17, 2016

(87) PCT Pub. No.: WO2015/158578
PCT Pub. Date: Oct. 22, 2015

(65) Prior Publication Data
US 2017/0040650 A1    Feb. 9, 2017

(30) Foreign Application Priority Data

Apr. 17, 2014 (EP) .................... 14165148

(51) Int. Cl.
| | | |
|---|---|---|
| *H01M 10/42* | (2006.01) | |
| *H01M 10/0567* | (2010.01) | |
| *H01M 10/0525* | (2010.01) | |
| *H01M 10/0568* | (2010.01) | |
| *H01M 10/0569* | (2010.01) | |

(52) U.S. Cl.
CPC ... *H01M 10/4235* (2013.01); *H01M 10/0525* (2013.01); *H01M 10/0567* (2013.01); *H01M 10/0568* (2013.01); *H01M 10/0569* (2013.01); *H01M 2300/0025* (2013.01)

(58) Field of Classification Search
CPC ......... H01M 10/0567; H01M 10/0568; H01M 10/0569; H01M 10/4235; H01M 2300/0025
See application file for complete search history.

(56) References Cited

U.S. PATENT DOCUMENTS

| | | |
|---|---|---|
| 2011/0123871 A1 | 5/2011 | Nakagawa et al. |
| 2012/0219854 A1 | 8/2012 | Nakagawa et al. |
| 2012/0219866 A1 | 8/2012 | Onuki et al. |
| 2012/0308883 A1 | 12/2012 | Nakagawa et al. |
| 2013/0244122 A1 | 9/2013 | Onuki et al. |
| 2014/0134481 A1 | 5/2014 | Nakagawa et al. |
| 2015/0140448 A1 | 5/2015 | Takiguchi et al. |

FOREIGN PATENT DOCUMENTS

| | | |
|---|---|---|
| EP | 1 335 445 A1 | 8/2003 |
| EP | 2 108 640 A1 | 10/2009 |
| EP | 2 249 426 A1 | 11/2010 |
| EP | 2 475 041 A1 | 7/2012 |
| EP | 2 869 389 A1 | 5/2015 |
| JP | 2000-268830 A | 9/2000 |
| KR | 10-2013-0137958 A | 12/2013 |
| WO | WO 2013/026854 A1 | 2/2013 |
| WO | WO 2014/003165 A1 | 1/2014 |

OTHER PUBLICATIONS

Lee et al. "Ionic Conductivities of the LiCF3SO3 Complexes with Liquid Crystalline Aromatic Polyesters Having Oligo(oxyethylene) Pendants", Macromolecular Research, vol. 12, No. 2, pp. 195-205 (Year: 2004).*
Ran Elazari, et al., "Rechargeable lithiated silicon-sulfur (SLS) battery prototypes" Electrochemistry Communications, vol. 14, 2012, pp. 21-24.
Sheng Shui Zhang, "A review on electrolyte additives for lithium-ion batteries" Journal of Power Sources, vol. 162, 2006, pp. 1379-1394.
International Search Report dated Jun. 17, 2015 in PCT/EP2015/057561.
International Preliminary Report on Patentability and Written Opinion dated Oct. 18, 2016 in PCT/EP2015/057561.

* cited by examiner

*Primary Examiner* — Sarah A. Slifka
*Assistant Examiner* — Brent C Thomas
(74) *Attorney, Agent, or Firm* — Young Basile Hanlon & MacFarlane, P.C.

(57) ABSTRACT

The invention relates to an electrolyte composition containing at least one compound of (I) wherein $R^1$ is selected from $C_1$ to $C_{10}$ alkyl, and $R^2$ is selected from $O(C_1$ to $C_{10}$ alkyl), $OC(O)(C_1$ to $C_{10}$ alkyl), $OC(O)O(C_1$ to $C_{10}$ alkyl), $OS(O)2$ $(C_1$ to $C_{10}$ alkyl) and $S(O)_2O(C_1$ to $C_{10}$ alkyl), wherein $C_1$ to $C_{10}$ alkyl may be substituted by one or more F and wherein one or more $CH_2$— groups of $C_1$ to $C_{10}$ alkyl which are not bound directly to O may be replaced by O.

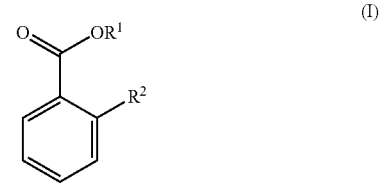

13 Claims, No Drawings

ALKYLBENZOATE DERIVATIVES AS ELECTROLYTE ADDITIVE FOR LITHIUM BASED BATTERIES

The present invention relates to an electrolyte composition containing at least one compound of formula (I)

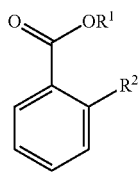

wherein $R^1$ and $R^2$ are defined below, to their use as overcharge protection additives in an electrolyte composition for electrochemical cells and to electrochemical cells comprising such electrolyte composition.

Storing electrical energy is a subject of still growing interest. Efficient storage of electric energy would allow electric energy to be generated when it is advantageous and used when needed. Secondary electrochemical cells are well suited for this purpose due to their rechargeability. Secondary lithium batteries are of special interest for energy storage since they provide high energy density due to the small atomic weight and the large ionization energy of lithium and have become widely used as a power source for many portable electronics such as cellular phones, laptop computers, mini-cameras, etc.

If lithium ion batteries are charged in excess of their nominal voltage, e.g. by a defect in the charging station, the batteries tend to heat up which can in the worst case lead to a thermal runaway. As lithium ion batteries typically comprise flammable components such as the electrolyte compositions or the anode, the heat generated when overcharged can lead to ignition.

One possibility to deal with the safety hazard is the addition of overcharge protection additives which terminate cell operation permanently. Such additives are usually aromatic compounds like biphenyl and cyclohexylphenyl, which polymerize at the cathode to release gas. The resulting polymer isolates the cathode from further overcharging while the gas activates a current interrupting device (S. S. Zhang, Journal of Power Sources 2006, 162 1379-1394). EP 1 335 445 discloses a combination of aromatic compounds as electrolyte additives which oxidatively polymerize in the electrolyte when the battery is overcharged. However, the development of novel cathode active materials allowing the use of a lithium ion battery at higher voltages requires overcharge protection additives being effective at higher voltages, too.

It is the object of the present invention to provide alternative overcharge protection additives and preferably to increase the safety of a lithium ion battery, in particular its overcharge protection efficiency at higher voltages. At the same time the lithium ion batteries comprising said overcharge protection additives should show high electrochemical performance.

This object is achieved by an electrolyte composition containing at least one compound of formula (I)

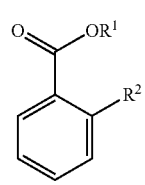

wherein
$R^1$ is selected from $C_1$ to $C_{10}$ alkyl; and
$R^2$ is selected from $O(C_1$ to $C_{10}$ alkyl), $OC(O)(C_1$ to $C_{10}$ alkyl), $OC(O)O(C_1$ to $C_{10}$ alkyl), $OS(O)_2(C_1$ to $C_{10}$ alkyl) and $S(O)_2O(C_1$ to $C_{10}$ alkyl);
wherein $C_1$ to $C_{10}$ alkyl may be substituted by one or more F and wherein one or more $CH_2$— groups of $C_1$ to $C_{10}$ alkyl which are not bound directly to O may be replaced by O.

The problem is further solved by the use of a compound of formula (I) as overcharge protection additives in electrolyte compositions, and by electrochemical cells comprising the electrolyte composition.

The compounds of general formula (I) have a higher value of the onset potential of overcharge protection than the known overcharge protection agent biphenyl without undesired effects on the cycling performance of the cell.

The term "$C_1$-$C_{10}$ alkyl" as used herein means a straight or branched saturated hydrocarbon group with 1 to 10 carbon atoms having one free valence and includes, e.g., methyl, ethyl, n-propyl, isopropyl, n-butyl, isobutyl, tert-butyl, n-pentyl, iso-pentyl, 2,2-dimethylpropyl, n-hexyl, iso-hexyl, 2-ethyl hexyl, n-heptyl, iso-heptyl, n-octyl, iso-octyl, n-nonyl, n-decyl and the like. Preferred are $C_1$-$C_6$ alkyl groups, more preferred are $C_1$-$C_4$ alkyl groups, and most preferred are methyl, ethyl, and n- and iso-propyl.

In the following the compounds of formula (I) are described in detail.

$R^1$ is selected from $C_1$ to $C_{10}$ alkyl, wherein $C_1$ to $C_{10}$ alkyl may be substituted by one or more F and wherein one or more $CH_2$-groups of $C_1$ to $C_{10}$ alkyl which are not bound directly to O may be replaced by O, more preferred $R^1$ is selected from $C_1$ to $C_6$ alkyl wherein $C_1$ to $C_6$ alkyl may be substituted by one or more F and wherein one or more $CH_2$-groups of $C_1$ to $C_6$ alkyl which are not bound directly to O may be replaced by O. Examples of $R^1$ are methyl, ethyl, iso-propyl, n-propyl, n-butyl, n-pentyl, n-hexyl, trifluoromethyl, 2,2,2-trifluoroethyl, and 2-ethoxyethyl, preferably $R^1$ is methyl.

$R^2$ is selected from $O(C_1$ to $C_{10}$ alkyl), $OC(O)(C_1$ to $C_{10}$ alkyl), $OC(O)O(C_1$ to $C_{10}$ alkyl), $OS(O)_2(C_1$ to $C_{10}$ alkyl) and $S(O)_2O(C_1$ to $C_{10}$ alkyl), wherein $C_1$ to $C_{10}$ alkyl may be substituted by one or more F and wherein one or more $CH_2$-groups of $C_1$ to $C_{10}$ alkyl which are not bound directly to O may be replaced by O. Preferably $R^2$ is selected from $O(C_1$ to $C_6$ alkyl), $OC(O)(C_1$ to $C_6$ alkyl), $OC(O)O(C_1$ to $C_6$ alkyl), $OS(O)_2(C_1$ to $C_6$ alkyl) and $S(O)_2O(C_1$ to $C_6$ alkyl), wherein $C_1$ to $C_6$ alkyl may be substituted by one or more F and wherein one or more $CH_2$-groups of $C_1$ to $C_6$ alkyl which are not bound directly to O may be replaced by O. Examples of $R^2$ are alkoxy such as methoxy, ethoxy, n-propoxy, n-butoxy, 2-methoxyethoxy, and 2-ethoxyethoxy; carboxylates such as formiate, acetate, 1-propionate, and 1-butanoate; carbonate groups like methylcarbonate, ethylcarbonate, n-propylcarbonate and n-butylcarbonate;

and alkylsulfonates like methylsulfonate, ethylsulfonate, n-propylsulfonate, and n-butlysulfonate.

According to one embodiment of the present invention the electrolyte composition according to the present invention comprises at least one compound of formula (I) wherein $R^1$ is selected from $C_1$ to $C_{10}$ alkyl and $R^2$ is selected from $O(C_1$ to $C_{10}$ alkyl), preferably $R^1$ is selected from $C_1$ to $C_6$ alkyl and $R^2$ is selected from $O(C_1$ to $C_6$ alkyl) and wherein alkyl may be substituted by one or more F and wherein one or more $CH_2$-groups of alkyl which are not bound directly to O may be replaced by O. An example is methyl-2-methoxybenzoat.

According to another embodiment of the present invention the electrolyte composition comprises at least one compound of formula (I) wherein $R^1$ is selected from $C_1$ to $C_{10}$ alkyl and $R^2$ is selected from $OC(O)(C_1$ to $C_{10}$ alkyl), preferably $R^1$ is selected from $C_1$ to $C_6$ alkyl and $R^2$ is selected from $OC(O)(C_1$ to $C_6$ alkyl), and wherein alkyl may be substituted by one or more F and wherein one or more $CH_2$-groups of alkyl which are not bound directly to O may be replaced by O. An example is methylacetylsalicylate.

According to another embodiment of the present invention the electrolyte composition comprises at least one compound of formula (I) wherein $R^1$ is selected from $C_1$ to $C_{10}$ alkyl and $R^2$ is selected from $OC(O)O(C_1$ to $C_{10}$ alkyl), preferably $R^1$ is selected from $C_1$ to $C_6$ alkyl and $R^2$ is selected from $OC(O)O(C_1$ to $C_6$ alkyl), and wherein alkyl may be substituted by one or more F and wherein one or more $CH_2$-groups of alkyl which are not bound directly to O may be replaced by O.

According to a further embodiment of the present invention the electrolyte composition according to the present invention comprises at least one compound of formula (I) wherein $R^1$ is selected from $C_1$ to $C_{10}$ alkyl, and $R^2$ is selected from $OS(O)_2(C_1$ to $C_{10}$ alkyl) and $S(O)_2O(C_1$ to $C_{10}$ alkyl), preferably $R^1$ is selected from $C_1$ to $C_6$ alkyl, and $R^2$ is selected from $OS(O)_2(C_1$ to $C_6$ alkyl) and $S(O)_2O(C_1$ to $C_6$ alkyl), and wherein alkyl may be substituted by one or more F and wherein one or more $CH_2$-groups of $C_1$ to $C_6$ alkyl which are not bound directly to O may be replaced by O.

For example the electrolyte composition according to the present invention may contain at least one compound of formula (I) selected from methylacetylsalicylate and methyl-2-methoxybenzoate.

The concentration of the at least one compound of formula (I) in the electrolyte composition according to the present invention is usually in the range of 0.1 to 20 wt.-%, based on the total weight of the electrolyte composition, preferably in the range of 1 to 10 wt.-%, more preferred in the range of 2 to 5 wt.-%, based on the total weight of the electrolyte composition.

The compounds of the formula (I)

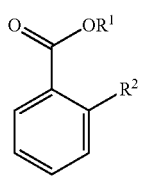

(I)

wherein
$R^1$ is selected from $C_1$ to $C_{10}$ alkyl; and
$R^2$ is selected from $O(C_1$ to $C_{10}$ alkyl), $OC(O)(C_1$ to $C_{10}$ alkyl), $OC(O)O(C_1$ to $C_{10}$ alkyl), $OS(O)_2(C_1$ to $C_{10}$ alkyl) and $S(O)_2O(C_1$ to $C_{10}$ alkyl);
wherein $C_1$ to $C_{10}$ alkyl may be substituted by one or more F and wherein one or more $CH_2$— groups of $C_1$ to $C_{10}$ alkyl which are not bound directly to O may be replaced by O, including the compounds as described above as being preferred, may be used as overcharge protection additive in an electrolyte composition. Therefore, a further object of the present invention is the use of compounds of formula (I) as described above as overcharge protection additives in electrolyte compositions. Accordingly, when the compounds of the formula (I) are used as overcharge protection additive in an electrolyte composition, the typical concentration is 0.1 to 20 wt.-%, preferred 1 to 10 wt.-% and most preferred 2 to 5 wt.-% based on the total weight of the electrolyte composition. The electrolyte compositions are used in electrochemical cells, preferred in lithium batteries, and more preferred in lithium ion batteries.

The electrolyte composition according to the present invention may contain at least one further additive. The further additive may be selected from SEI forming additives, flame retardants, additional overcharge protection additives, wetting agents, HF and/or $H_2O$ scavenger, stabilizer for $LiPF_6$ salt, ionic salvation enhancer, corrosion inhibitors, gelling agents, and the like.

Examples of flame retardants are organic phosphorous compounds like cyclophosphazenes, phosphoramides, alkyl and/or aryl tri-substituted phosphates, alkyl and/or aryl di- or tri-substituted phosphites, alkyl and/or aryl di-substituted phosphonates, alkyl and/or aryl tri-substituted phosphines, and fluorinated derivatives thereof.

Examples of HF and/or $H_2O$ scavenger are optionally halogenated cyclic and acyclic silylamines.

Preferably the electrolyte composition according to the present invention contains at least one SEI forming additive and/or at least one additional overcharge protection additive.

An SEI forming additive according to the present invention is a compound which decomposes on an electrode to form a passivation layer on the electrode which prevents degradation of the electrolyte and/or the electrode. In this way, the lifetime of a battery is significantly extended. SEI forming additives are often also called film forming additives. Preferably the SEI forming additive forms a passivation layer on the anode. An anode in the context of the present invention is understood as the negative electrode of a battery. Preferably, the anode has a reduction potential of 1 Volt or less against lithium such as a lithium intercalating graphite anode. In order to determine if a compound qualifies as anode film forming additive, an electrochemical cell can be prepared comprising a graphite electrode and a lithium-ion containing cathode, for example lithium cobalt oxide, and an electrolyte containing a small amount of said compound, typically from 0.1 to 10 wt.-% of the electrolyte composition, preferably from 0.2 to 5 wt.-% of the electrolyte composition. Upon application of a voltage between anode and cathode, the differential capacity of the electrochemical cell is recorded between 0.5 V and 2 V. If a significant differential capacity is observed during the first cycle, for example −150 mAh/V at 1 V, but not or essentially not during any of the following cycles in said voltage range, the compound can be regarded as SEI forming additive.

According to the present invention the electrolyte composition preferably contains at least one SEI forming additive. SEI forming additives are known to the person skilled in the art. More preferred the electrolyte composition contains at least one SEI forming selected from vinylene carbonate and its derivatives such as vinylene carbonate and methylvinylene carbonate; fluorinated ethylene carbonate and its derivatives such as monofluoroethylene carbonate, cis- and trans-difluorocarbonate; propane sultone and its derivatives; ethylene sulfite and its derivatives; oxalate comprising compounds such as lithium oxalate, oxalato borates including dimethyl oxalate, lithium bis(oxalate) borate, lithium difluoro (oxalato) borate, and ammonium bis(oxalato) borate, and oxalato phosphates including lithium tetrafluoro (oxalato) phosphate; and ionic compounds containing a cation of formula (II)

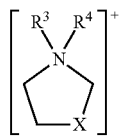

(II)

wherein
X is $CH_2$ or $NR'$,
$R^3$ is selected from $C_1$ to $C_6$ alkyl,
$R^4$ is selected from $—(CH_2)_u—SO_3—(CH_2)_v—R''$,
$—SO_3—$ is $—O—S(O)_2—$ or $—S(O)_2—O—$, preferably $—SO_3—$ is $—)—S(O)_2—$,
u is an integer from 1 to 8, preferably u is 2, 3 or 4, wherein one or more $CH_2$ groups of the $—(CH_2)_u—$ alkylene chain which are not directly bound to the N-atom and/or the $SO_3$ group may be replaced by O and wherein two adjacent $CH_2$ groups of the $—(CH_2)_u—$ alkylene chain may be replaced by a C—C double bond, preferably the $—(CH_2)_u—$ alkylene chain is not substituted and u
u is an integer from 1 to 8, preferably u is 2, 3 or 4,
v is an integer from 1 to 4, preferably v is 0,
$R'$ is selected from $C_1$ to $C_6$ alkyl,
$R''$ is selected from $C_1$-$C_{20}$ alkyl, $C_2$-$C_{20}$ alkenyl, $C_2$-$C_{20}$ alkynyl, $C_6$-$C_{12}$ aryl, and $C_6$-$C_{24}$ aralkyl, which may contain one or more F, and wherein one or more $CH_2$ groups of alkyl, alkenyl, alkynyl and aralkyl which are not directly bound to the $SO_3$ group may be replaced by O, preferably $R''$ is selected from $C_1$-$C_6$ alkyl, $C_2$-$C_4$ alkenyl, and $C_2$-$C_4$ alkynyl, which may contain one or more F, and wherein one or more $CH_2$ groups of alkyl, alkenyl, alkynyl and aralkyl which are not directly bound to the $SO_3$ group may be replaced by O, preferred examples of $R''$ include methyl, ethyl, trifluoromethyl, pentafluoroethyl, n-propyl, n-butyl, n-hexyl, ethenyl, ethynyl, allyl or prop-1-yn-yl,
and an anion selected from bisoxalato borate, difluoro (oxalato) borate, $[F_zB(C_mF_{2m+1})_{4-z}]^-$,
$[F_yP(C_mF_{2m+1})_{6-y}]^-$, $(C_mF_{2m+1})_2P(O)O]^-$, $[C_mF_{2m+1}P(O)O_2]^{2-}$, $[O—C(O)—C_mF_{2m+1}]^-$, $[O—S(O)_2—C_mF_{2m+1}]^-$,
$[N(C(O)—C_mF_{2m+1})_2]^-$, $[N(S(O)_2—C_mF_{2m+1})_2]^-$, $[N(C(O)—C_mF_{2m+1})(S(O)_2—C_mF_{2m+1})]^-$, $[N(C(O)—C_mF_{2m+1})(C(O)F)]^-$, $[N(S(O)_2—C_mF_{2m+1})(S(O)_2F)]^-$, $[N(S(O)_2F)_2]^-$, $[C(C(O)—C_mF_{2m+1})_3]^-$, $[C(S(O)_2—C_mF_{2m+1})_3]^-$, wherein m is an integer from 1 to 8, z is an integer from 1 to 4, and y is an integer from 1 to 6,
Preferred anions are bisoxalato borate, difluoro (oxalato) borate, $[F_3B(CF_3)]^-$, $[F_3B(C_2F_5)]^-$, $[PF_6]^-$, $[F_3P(C_2F_5)_3]^-$, $[F_3P(C_3F_7)_3]^-$, $[F_3P(C_4F_9)_3]^-$, $[F_4P(C_2F_5)_2]^-$, $[F_4P(C_3F_7)_2]^-$, $[F_4P(C_4F_9)_2]^-$, $[F_5P(C_2F_5)]^-$,
$[F_5P(C_3F_7)]^-$ or $[F_5P(C_4F_9)]^-$, $[(C_2F_5)_2P(O)O]^-$, $[(C_3F_7)_2P(O)O]^-$ or $[(C_4F_9)_2P(O)O]^-$, $[C_2F_5P(O)O_2]^{2-}$, $[C_3F_7P(O)O_2]^{2-}$, $[C_4F_9P(O)O_2]^{2-}$, $[O—C(O)CF_3]^-$, $[O—C(O)C_2F_5]^-$, $[O—C(O)C_4F_9]^-$, $[O—S(O)_2CF_3]^-$,
$[O—S(O)_2C_2F_5]^-$, $[N(C(O)C_2F_5)_2]^-$, $[N(C(O)(CF_3)_2]^-$, $[N(S(O)_2CF_3)_2]^-$, $[N(S(O)_2C_2F_5)_2]^-$,
$[N(S(O)_2C_3F_7)_2]^-$, $[N(S(O)_2CF_3)(S(O)_2C_2F_5)]^-$, $[N(S(O)_2C_4F_9)_2]^-$, $[N(C(O)CF_3)(S(O)_2CF_3)]^-$,
$[N(C(O)C_2F_5)(S(O)_2CF_3)]^-$ or $[N(C(O)CF_3)(S(O)_2—C_4F_9)]^-$, $[N(C(O)CF_3)(C(O)F)]^-$,
$[N(C(O)C_2F_5)(C(O)F)]^-$, $[N(C(O)C_3F_7)(C(O)F)]^-$, $[N(S(O)_2CF_3)(S(O)_2F)]^-$, $[N(S(O)_2C_2F_5)(S(O)_2F)]^-$,
$[N(S(O)_2C_4F_9)(S(O)_2F)]^-$, $[C(C(O)CF_3)_3]^-$, $[C(C(O)C_2F_5)_3]^-$ or $[C(C(O)C_3F_7)_3]^-$, $[C(S(O)_2CF_3)_3]^-$,
$[C(S(O)_2C_2F_5)_3]^-$, and $[C(S(O)_2C_4F_9)_3]^-$.

More preferred the anion is selected from bisoxalato borate, difluoro (oxalato) borate, $CF_3SO_3^-$, and $[PF_3(C_2F_5)_3]^-$.

The term "$C_2$-$C_{20}$ alkenyl" as used herein refers to an unsaturated straight or branched hydrocarbon group with 2 to 20 carbon atoms having one free valence. Unsaturated means that the alkenyl group contains at least one C—C double bond. $C_2$-$C_6$ alkenyl includes for example ethenyl, 1-propenyl, 2-propenyl, 1-n-butenyl, 2-n-butenyl, iso-butenyl, 1-pentenyl, 1-hexenyl, 1-heptenyl, 1-octenyl, 1-nonenyl, 1-decenyl and the like. Preferred are $C_2$-$C_{10}$ alkenyl groups, more preferred are $C_2$-$C_6$ alkenyl groups, even more preferred are $C_2$-$C_4$ alkenyl groups and in particular ethenyl and 1-propen-3-yl (allyl).

The term "$C_2$-$C_{20}$ alkynyl" as used herein refers to an unsaturated straight or branched hydrocarbon group with 2 to 20 carbon atoms having one free valence, wherein the hydrocarbon group contains at least one C—C triple bond. $C_2$-$C_6$ alkynyl includes for example ethynyl, 1-propynyl, 2-propynyl, 1-n-butinyl, 2-n-butynyl, iso-butinyl, 1-pentynyl, 1-hexynyl, -heptynyl, 1-octynyl, 1-nonynyl, 1-decynyl and the like and the like. Preferred are $C_2$-$C_{10}$ alkynyl, more preferred are $C_2$-$C_6$ alkynyl, even more preferred are $C_2$-$C_4$ alkynyl, in particular preferred are ethynyl and 1-propyn-3-yl (propargyl).

The term "$C_6$-$C_{12}$ aryl" as used herein denotes an aromatic 6- to 12-membered hydrocarbon cycle or condensed cycles having one free valence. Examples of $C_6$-$C_{12}$ aryl are phenyl and naphtyl. Preferred is phenyl.

The term "$C_7$-$C_{24}$ aralkyl" as used herein denotes an aromatic 6- to 12-membered aromatic hydrocarbon cycle or condensed aromatic cycles substituted by one or more $C_1$-$C_6$ alkyl. The $C_7$-$C_{24}$ aralkyl group contains in total 7 to 24 C-atoms and has one free valence. The free valence may be located at the aromatic cycle or at a $C_1$-$C_6$ alkyl group, i.e. $C_7$-$C_{24}$ aralkyl group may be bound via the aromatic part or via the alkyl part of the aralkyl group. Examples of $C_7$-$C_{24}$ aralkyl are methylphenyl, benzyl, 1,2-dimethylphenyl, 1,3-dimethylphenyl, 1,4-dimethylphenyl, ethylphenyl, 2-propylphenyl, and the like.

Compounds of formula (II) and their preparation are described in detail in WO 2013/026854 A1. Examples of compounds of formula (II) which are preferred according to the present invention are disclosed on page 12, line 21 to page 15, line 13 of WO 2013/026854 A1.

Preferred SEI-forming additives are oxalato borates, fluorinated ethylene carbonate and its derivatives, vinylene carbonate and its derivatives, and compounds of formula (II). More preferred are lithium bis(oxalato) borate, vinylene carbonate, monofluoro ethylene carbonate, and compounds of formula (II), in particular monofluoro ethylene carbonate, and compounds of formula (II).

Preferably the electrolyte composition contains at least one additional overcharge protection additive selected from compounds of formula (III)

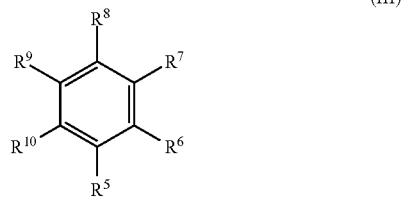

(III)

$R^5$ is cyclohexyl or $C_6$-$C_{12}$ aryl, which may be substituted by one or more substituent selected independently from each other from F, Cl, Br, I, $C_6$-$C_{12}$ aryl, and $C_1$-$C_6$ alkyl, wherein $C_6$-$C_{12}$ aryl and $C_1$-$C_6$ alkyl may be substituted by one or more substituent selected independently from each other from F, Cl, Br and I; and $R^6$, $R^7$, $R^8$, $R^9$ and $R^{10}$ may be same or different and are independently from each other selected from H, F, Cl, Br, I, $C_6$-$C_{12}$ aryl, and $C_1$-$C_6$ alkyl, wherein $C_6$-$C_{12}$ aryl and $C_1$-$C_6$ alkyl may be substituted by one or more substituent selected independently from each other from F, Cl, Br and I.

Examples of compounds of formula (III) are cyclohexylbenzene, biphenyl, o-terphenyl and p-terphenyl, preferred compounds of formula (III) are cyclohexylbenzene and biphenyl.

According to the present invention the electrolyte composition contains usually at least 0.1 wt.-% compound of general formula (III), based on the total weight of the electrolyte composition. If the compound of general formula (III) is present to more than 10 wt.-% of the total weight of the electrolyte composition no further improvement can be observed. Preferably the compound of general formula (III) is present from 1 to 10 wt-% of the total weight of the electrolyte composition, in particular from 1 to 5 wt.-% of the total weight of the electrolyte composition.

A compound added as further additive may have more than one effect in the electrolyte composition and the device comprising the electrolyte composition. E.g. lithium oxalato borate may be added as additive enhancing the SEI formation but may also be added as conducting salt.

According to one embodiment of the present invention the electrolyte composition contains at least one compound of formula (I), at least one SEI forming additive and at least one additional overcharge protection additive of formula (III), all as described above or as described as being preferred.

Viewed chemically, an electrolyte composition is any composition which comprises free ions and as a result is electrically conductive. The most typical electrolyte composition is an ionic solution, although molten electrolyte compositions and solid electrolyte compositions are likewise possible. An electrolyte composition of the invention is therefore an electrically conductive medium, primarily due to the presence of at least one substance which is present in a dissolved and/or molten state, i.e., an electrical conductivity supported by movement of ionic species.

The inventive electrolyte composition is preferably liquid at working conditions; more preferred it is liquid at 1 bar and 25° C., even more preferred the electrolyte composition is liquid at 1 bar and −15° C., in particular the electrolyte composition is liquid at 1 bar and −30° C., even more preferred the electrolyte composition is liquid at 1 bar and −50° C.

The electrolyte composition preferably contains at least one aprotic organic solvent, more preferred at least two aprotic organic solvents. According to one embodiment the electrolyte composition may contain up to ten aprotic organic solvents.

The at least one aprotic organic solvent is preferably selected from cyclic and acyclic organic carbonates, di-$C_1$-$C_{10}$-alkylethers, di-$C_1$-$C_4$-alkyl-$C_2$-$C_6$-alkylene ethers and polyethers, cyclic ethers, cyclic and acyclic acetales and ketales, orthocarboxylic acids esters, cyclic and acyclic esters of carboxylic acids, cyclic and acyclic sulfones, and cyclic and acyclic nitriles and dinitriles.

More preferred the at least one aprotic organic solvent is selected from cyclic and acyclic carbonates, di-$C_1$-$C_{10}$-alkylethers, di-$C_1$-$C_4$-alkyl-$C_2$-$C_6$-alkylene ethers and polyethers, cyclic and acyclic acetales and ketales, and cyclic and acyclic esters of carboxylic acids, even more preferred the electrolyte composition contains at least one aprotic organic solvent selected from cyclic and acyclic carbonates, and most preferred the electrolyte composition contains at least two aprotic organic solvents selected from cyclic and acyclic carbonates, in particular preferred the electrolyte composition contains at least one aprotic solvent selected from cyclic carbonates and at least one aprotic organic solvent selected from acyclic carbonates.

The aprotic organic solvents may be partly halogenated, e.g. they may be partly fluorinated, partly chlorinated or partly brominated, and preferably they may be partly fluorinated. "Partly halogenated" means, that one or more H of the respective molecule is substituted by a halogen atom, e.g. by F, Cl or Br. Preference is given to the substitution by F. The at least one solvent may be selected from partly halogenated and non-halogenated aprotic organic solvents i.e. the electrolyte composition may contain a mixture of partly halogenated and non-halogenated aprotic organic solvents.

Examples of cyclic carbonates are ethylene carbonate (EC), propylene carbonate (PC) and butylene carbonate (BC), wherein one or more H of the alkylene chain may be substituted by F and/or an $C_1$ to $C_4$ alkyl group, e.g. 4-methyl ethylene carbonate, monofluoroethylene carbonate (FEC), and cis- and trans-difluoroethylene carbonate. Preferred cyclic carbonates are ethylene carbonate, monofluoroethylene carbonate and propylene carbonate, in particular ethylene carbonate.

Examples of acyclic carbonates are di-$C_1$-$C_{10}$-alkylcarbonates, wherein each alkyl group is selected independently from each other, preferred are di-$C_1$-$C_4$-alkylcarbonates. Examples are e.g. diethyl carbonate (DEC), ethyl methyl carbonate (EMC), dimethyl carbonate (DMC), and methylpropyl carbonate. Preferred acyclic carbonates are diethyl carbonate (DEC), ethyl methyl carbonate (EMC), dimethyl carbonate (DMC).

In one embodiment of the invention the electrolyte composition contains mixtures of acyclic organic carbonates and cyclic organic carbonates at a ratio by weight of from 1:10 to 10:1, preferred of from 3:1 to 1:1.

According to the invention each alkyl group of the di-$C_1$-$C_{10}$-alkylethers is selected independently from the other. Examples of di-$C_1$-$C_{10}$-alkylethers are dimethylether, ethylmethylether, diethylether, methylpropylether, diisopropylether, and di-n-butylether.

Examples of di-$C_1$-$C_4$-alkyl-$C_2$-$C_6$-alkylene ethers are 1,2-dimethoxyethane, 1,2-diethoxyethane, diglyme (diethylene glycol dimethyl ether), triglyme (triethyleneglycol dimethyl ether), tetraglyme (tetraethyleneglycol dimethyl ether), and diethylenglycoldiethylether.

Examples of suitable polyethers are polyalkylene glycols, preferably poly-$C_1$-$C_4$-alkylene glycols and especially polyethylene glycols. Polyethylene glycols may comprise up to 20 mol % of one or more $C_1$-$C_4$-alkylene glycols in copolymerized form. Polyalkylene glycols are preferably dimethyl- or diethyl-end-capped polyalkylene glycols. The molecular weight $M_w$ of suitable polyalkylene glycols and especially of suitable polyethylene glycols may be at least 400 g/mol. The molecular weight $M_w$ of suitable polyalkylene glycols and especially of suitable polyethylene glycols may be up to 5 000 000 g/mol, preferably up to 2 000 000 g/mol.

Examples of cyclic ethers are 1,4-dioxane, tetrahydrofuran, and their derivatives like 2-methyl tetrahydrofuran.

Examples of acyclic acetals are 1,1-dimethoxymethane and 1,1-diethoxymethane. Examples of cyclic acetals are 1,3-dioxane, 1,3-dioxolane, and their derivatives such as methyl dioxolane.

Examples of acyclic orthocarboxylic acid esters are tri-$C_1$-$C_4$ alkoxy methane, in particular trimethoxymethane and triethoxymethane. Examples of suitable cyclic orthocarboxylic acid esters are 1,4-dimethyl-3,5,8-trioxabicyclo[2.2.2]octane and 4-ethyl-1-methyl-3,5,8-trioxabicyclo[2.2.2]octane.

Examples of acyclic esters of carboxylic acids are ethyl and methyl formiate, ethyl and methyl acetate, ethyl and methyl proprionate, and ethyl and methyl butanoate, and esters of dicarboxylic acids like 1,3-dimethyl propanedioate. An example of a cyclic ester of carboxylic acids (lactones) is γ-butyrolactone.

Examples of cyclic and acyclic sulfones are ethyl methyl sulfone, dimethyl sulfone, and tetrahydrothiophene-S,S-dioxide (sulfolane).

Examples of cyclic and acyclic nitriles and dinitriles are adipodinitrile, acetonitrile, propionitrile, and butyronitrile.

The water content of the inventive electrolyte composition is preferably below 100 ppm, based on the weight of the electrolyte composition, more preferred below 50 ppm, most preferred below 30 ppm. The water content may be determined by titration according to Karl Fischer, e.g. described in detail in DIN 51777 or ISO760: 1978.

The content of HF of the inventive electrolyte composition is preferably below 60 ppm, based on the weight of the electrolyte composition, more preferred below 40 ppm, most preferred below 20 ppm. The HF content may be determined by titration according to potentiometric or potentiographic titration method.

The inventive electrolyte composition usually contains at least one conducting salt. The electrolyte composition functions as a medium that transfers ions participating in the electrochemical reaction taking place in an electrochemical cell. The conducting salt(s) present in the electrolyte are usually solvated in the aprotic organic solvent(s). Preferably the conducting salt is a lithium salt. The conducting salt is preferably selected from the group consisting of $Li[F_{6-x}P(C_yF_{2y+1})_x]$, wherein x is an integer in the range from 0 to 6 and y is an integer in the range from 1 to 20;

$Li[B(R^I)_4]$, $Li[B(R^I)_2(OR^{II}O)]$ and $Li[B(OR^{II}O)_2]$ wherein each $R^I$ is independently from each other selected from F, Cl, Br, I, $C_1$-$C_4$ alkyl, $C_2$-$C_4$ alkenyl, $C_2$-$C_4$ alkynyl, $OC_1$-$C_4$ alkyl, $OC_2$-$C_4$ alkenyl, and $OC_2$-$C_4$ alkynyl wherein alkyl, alkenyl, and alkynyl may be substituted by one or more $OR^{III}$, wherein $R^{III}$ is selected from $C_1$-$C_6$ alkyl, $C_2$-$C_6$ alkenyl, and $C_2$-$C_6$ alkynyl, and ($OR^{II}O$) is a bivalent group derived from a 1,2- or 1,3-diol, a 1,2- or 1,3-dicarboxlic acid or a 1,2- or 1,3-hydroxycarboxylic acid, wherein the bivalent group forms a 5- or 6-membered cycle via the both oxygen atoms with the central B-atom;

$LiClO_4$; $LiAsF_6$; $LiCF_3SO_3$; $Li_2SiF_6$; $LiSbF_6$; $LiAlCl_4$; $Li(N(SO_2F)_2)$, lithium tetrafluoro (oxalato) phosphate; lithium oxalate; and salts of the general formula $Li[Z(C_nF_{2n+1}SO_2)_m]$, where m and n are defined as follows:
   m=1 when Z is selected from oxygen and sulfur,
   m=2 when Z is selected from nitrogen and phosphorus,
   m=3 when Z is selected from carbon and silicon, and
   n is an integer in the range from 1 to 20.

Suited 1,2- and 1,3-diols from which the bivalent group ($OR^{II}O$) is derived may be aliphatic or aromatic and may be selected, e.g., from 1,2-dihydroxybenzene, propane-1,2-diol, butane-1,2-diol, propane-1,3-diol, butan-1,3-diol, cyclohexyl-trans-1,2-diol and naphthalene-2,3-diol which are optionally are substituted by one or more F and/or by at least one straight or branched non fluorinated, partly fluorinated or fully fluorinated $C_1$-$C_4$ alkyl group. An example for such 1,2- or 1,3-diole is 1,1,2,2-tetra(trifluoromethyl)-1,2-ethane diol.

"Fully fluorinated $C_1$-$C_4$ alkyl group" means, that all H-atoms of the alkyl group are substituted by F.

Suited 1,2- or 1,3-dicarboxlic acids from which the bivalent group ($OR^{II}O$) is derived may be aliphatic or aromatic, for example oxalic acid, malonic acid (propane-1,3-dicarboxylic acid), phthalic acid or isophthalic acid, preferred is oxalic acid. The 1,2- or 1,3-dicarboxlic acid are optionally substituted by one or more F and/or by at least one straight or branched non fluorinated, partly fluorinated or fully fluorinated $C_1$-$C_4$ alkyl group.

Suited 1,2- or 1,3-hydroxycarboxylic acids from which the bivalent group ($OR^{II}O$) is derived may be aliphatic or aromatic, for example salicylic acid, tetrahydro salicylic acid, malic acid, and 2-hydroxy acetic acid, which are optionally substituted by one or more F and/or by at least one straight or branched non fluorinated, partly fluorinated or fully fluorinated $C_1$-$C_4$ alkyl group. An example for such 1,2- or 1,3-hydroxycarboxylic acids is 2,2-bis(trifluoromethyl)-2-hydroxy-acetic acid.

Examples of $Li[B(R^I)_4]$, $Li[B(R^I)_2(OR^{II}O)]$ and $Li[B(OR^{II}O)_2]$ are $LiBR_4$, lithium difluoro oxalato borate and lithium dioxalato borate.

Preferably the at least one conducting salt is selected from $LiPF_6$, $LiBR_4$, and $LiPF_3(CF_2CF_3)_3$, more preferred the conducting salt is selected from $LiPF_6$ and $LiBR_4$, and the most preferred conducting salt is $LiPF_6$.

The at least one conducting salt is usually present at a minimum concentration of at least 0.1 m/l, preferably the concentration of the at least one conducting salt is 0.5 to 2 mol/l based on the entire electrolyte composition.

When a solvent is present in the electrolyte composition of the invention there may also be a polymer included, the polymer being polyvinylidene fluoride, polyvinylidene-hexafluoropropylene copolymers, polyvinylidene-hexafluoropropylene-chlorotrifluoroethylene copolymers, Nafion, polyethylene oxide, polymethyl methacrylate, polyacrylonitrile, polypropylene, polystyrene, polybutadiene, polyethylene glycol, polyvinylpyrrolidone, polyaniline, polypyrrole and/or polythiophene. These polymers are added to the electrolytes in order to convert liquid electrolytes into quasi-solid or solid electrolytes and thus to improve solvent retention, especially during ageing.

The electrolyte compositions of the invention are prepared by methods which are known to the person skilled in the field of the production of electrolytes, generally by dissolving the conductive salt in the corresponding solvent mixture and adding the compounds of the formula (I) according to the invention and optionally additional additives, as described above.

The invention further provides an electrochemical cell comprising the electrolyte composition as described above or as described as being preferred. The electrochemical cell may be a lithium battery, a double layer capacitor, or a lithium ion capacitor The general construction of such electrochemical and electrooptical devices is known and is familiar to the person skilled in this art for batteries, for example, in Linden's Handbook of Batteries (ISBN 978-0-07-162421-3).

Preferably the electrochemical or electrooptical device is a lithium battery. The term "lithium battery" as used herein means an electrochemical cell, wherein the anode comprises lithium metal or lithium ions sometime during the charge/discharge of the cell. The anode may comprise lithium metal or a lithium metal alloy, a material occluding and releasing lithium ions, or other lithium containing compounds; e.g. the lithium battery may be a lithium ion battery, a lithium/sulphur battery, or a lithium/selenium sulphur battery.

In particular preferred the electrochemical device is a lithium ion battery, i.e. a secondary lithium ion electrochemical cell comprising a cathode comprising a cathode active material that can reversibly occlude and release lithium ions and an anode comprising an anode active material that can reversibly occlude and release lithium ions. The terms "secondary lithium ion electrochemical cell" and "(secondary) lithium ion battery" are used interchangeably within the present invention.

The at least one cathode active material preferably comprises a material capable of occluding and releasing lithium ions selected from lithiated transition metal phosphates and lithium ion intercalating metal oxides.

Examples of lithiated transition metal phosphates are $LiFePO_4$ and $LiCoPO_4$, examples of lithium ion intercalating metal oxides are $LiCoO_2$, $LiNiO_2$, mixed transition metal oxides with layer structure having the general formula $Li_{(1+z)}[Ni_aCo_bMn_c]_{(1-z)}O_{2+e}$ wherein z is 0 to 0.3; a, b and c may be same or different and are independently 0 to 0.8 wherein a+b+c=1; and $-0.1 \le e \le 0.1$, and manganese-containing spinels like $LiMnO_4$ and spinels of general formula $Li_{1+d}M_{2-t}O_{4-d}$ wherein d is 0 to 0.4, t is 0 to 0.4 and M is Mn and at least one further metal selected from the group consisting of Co and Ni, and $Li_{(1+g)}[Ni_hCo_iAl_j]_{(1-g)}O_{2+k}$. Typical values for g, h, l, j and k are: g=0, h=0.8 to 0.85, i=0.15 to 0.20, j=0.02 to 0.03 and k=0.

The cathode may further comprise electrically conductive materials like electrically conductive carbon and usual components like binders. Compounds suited as electrically conductive materials and binders are known to the person skilled in the art. For example, the cathode may comprise carbon in a conductive polymorph, for example selected from graphite, carbon black, carbon nanotubes, graphene or mixtures of at least two of the aforementioned substances. In addition, the cathode may comprise one or more binders, for example one or more organic polymers like polyethylene, polyacrylonitrile, polybutadiene, polypropylene, polystyrene, polyacrylates, polyvinyl alcohol, polyisoprene and copolymers of at least two comonomers selected from ethylene, propylene, styrene, (meth)acrylonitrile and 1,3-butadiene, especially styrene-butadiene copolymers, and halogenated (co)polymers like polyvinlyidene chloride, polyvinly chloride, polyvinyl fluoride, polyvinylidene fluoride (PVdF), polytetrafluoroethylene, copolymers of tetrafluoroethylene and hexafluoropropylene, copolymers of tetrafluoroethylene and vinylidene fluoride and polyacrylnitrile.

The anode comprised within the lithium batteries of the present invention comprises an anode active material that can reversibly occlude and release lithium ions or is capable to form an alloy with lithium. In particular carbonaceous material that can reversibly occlude and release lithium ions can be used as anode active material. Carbonaceous materials suited are crystalline carbon such as a graphite material, more particularly, natural graphite, graphitized cokes, graphitized MCMB, and graphitized MPCF; amorphous carbon such as coke, mesocarbon microbeads (MCMB) fired below 1500° C., and mesophase pitch-based carbon fiber (MPCF); hard carbon and carbonic anode active material (thermally decomposed carbon, coke, graphite) such as a carbon composite, combusted organic polymer, and carbon fiber.

Further anode active materials are lithium metal, or materials containing an element capable of forming an alloy with lithium. Non-limiting examples of materials containing an element capable of forming an alloy with lithium include a metal, a semimetal, or an alloy thereof. It should be understood that the term "alloy" as used herein refers to both alloys of two or more metals as well as alloys of one or more metals together with one or more semimetals. If an alloy has metallic properties as a whole, the alloy may contain a nonmetal element. In the texture of the alloy, a solid solution, a eutectic (eutectic mixture), an intermetallic compound or two or more thereof coexist. Examples of such metal or semimetal elements include, without being limited to, titanium (Ti), tin (Sn), lead (Pb), aluminum, indium (In), zinc (Zn), antimony (Sb), bismuth (Bi), gallium (Ga), germanium (Ge), arsenic (As), silver (Ag), hafnium (Hf), zirconium (Zr) yttrium (Y), and silicon (Si). Metal and semimetal elements of Group 4 or 14 in the long-form periodic table of the elements are preferable, and especially preferable are titanium, silicon and tin, in particular silicon. Examples of tin alloys include ones having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony and chromium (Cr). Examples of silicon alloys include ones having, as a second constituent element other than silicon, one or more elements selected from the group consisting of tin, magnesium, nickel, copper, iron, cobalt, manganese, zinc, indium, silver, titanium, germanium, bismuth, antimony and chromium.

A further possible anode active material is silicon which is able to intercalate lithium ions. The silicon may be used in different forms, e.g. in the form of nanowires, nanotubes, nanoparticles, films, nanoporous silicon or silicon nanotubes. The silicon may be deposited on a current collector. The current collector may be a metal wire, a metal grid, a metal web, a metal sheet, a metal foil or a metal plate. Preferred the current collector is a metal foil, e.g. a copper foil. Thin films of silicon may be deposited on metal foils by any technique known to the person skilled in the art, e.g. by sputtering techniques. One possibility of preparing Si thin film electrodes are described in R. Elazari et al.; Electrochem. Comm. 2012, 14, 21-24. It is also possible to use a silicon/carbon composite as anode active material according to the present invention.

Other possible anode active materials are lithium ion intercalating oxides of Ti.

Preferably the anode active material is selected from carbonaceous material that can reversibly occlude and release lithium ions, particularly preferred the carbonaceous material that can reversibly occlude and release lithium ions is selected from crystalline carbon, hard carbon and amorphous carbon, in particular preferred is graphite. In another preferred embodiment the anode active is selected from silicon that can reversibly occlude and release lithium ions, preferably the anode comprises a thin film of silicon or a silicon/carbon composite. In a further preferred embodiment the anode active is selected from lithium ion intercalating oxides of Ti.

The anode and cathode may be made by preparing an electrode slurry composition by dispersing the electrode active material, a binder, optionally a conductive material and a thickener, if desired, in a solvent and coating the slurry composition onto a current collector. The current collector may be a metal wire, a metal grid, a metal web, a metal sheet, a metal foil or a metal plate. Preferred the current collector is a metal foil, e.g. a copper foil or aluminum foil.

The inventive lithium batteries may contain further constituents customary per se, for example separators, housings, cable connections etc. The housing may be of any shape, for example cuboidal or in the shape of a cylinder, the shape of a prism or the housing used is a metal-plastic composite film processed as a pouch. Suited separators are for example glass fiber separators and polymer-based separators like polyolefin separators.

Several inventive lithium batteries may be combined with one another, for example in series connection or in parallel connection. Series connection is preferred. The present invention further provides for the use of inventive lithium ion batteries as described above in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven tackers. But the inventive lithium ion batteries can also be used for stationary energy stores.

Even without further statements, it is assumed that a skilled person is able to utilize the above description in its widest extent. Consequently, the preferred embodiments and examples are to be interpreted merely as a descriptive enclosure which in no way has any limiting effect at all.

The invention is illustrated by the examples which follow, which do not, however, restrict the invention.

1. Electrolyte Compositions

Electrolyte compositions were prepared from methyl-2-methoxybenzoate (M2Mb), methyl acetylsalicylate (MAS), biphenyl (BP) monofluoroethylene carbonate (FEC), ethylene carbonate (EC), lithium hexafluorophosphate (LiPF$_6$), ethyl methyl carbonate (EMC), and 1-methyl-1-{2-[(methylsulfonyl)oxy]ethyl}pyrrolidinium bis(oxalato) borate (S2B). S2B was The exact compositions are shown in Table 1. Wt.-% are based on the total weight of the electrolyte composition. S2B was prepared as described in WO 2013/026854 A1, all other compounds were purchased commercially.

| | Components |
|---|---|
| Example 1 | 1M LiPF$_6$ in EC:EMC 3:7 by wt. + 5 wt.-% M2Mb + 2 wt.-% FEC |
| Example 1 | 1M LiPF$_6$ in EC:EMC 3:7 by wt. + 5 wt.-% MAS |
| Comparative example 1 | 1M LiPF$_6$ in EC:EMC 3:7 by wt. |
| Comparative example 2 | 1M LiPF$_6$ in EC:EMC 3:7 by wt. + 5 wt.-% BP |

2. Electrochemical Tests

Button cells were fabricated using lithium nickel cobalt manganese oxide (LiNi$_{0.33}$Co$_{0.33}$Mn$_{0.33}$O$_2$; NCM 111) electrodes with a capacity of 2 mAh/cm$^2$ and a graphite electrode with a capacity of 2.15 mAh/cm$^2$. A glass-fiber filter separator (Whatmann GF/D) was used as separator, which was soaked with 100 µl of the respective electrolyte composition. All electrochemical measurements were carried out at 25° C. in climate chambers. For electrochemical testing the procedure displayed in Table 2 was used.

TABLE 2

| Cycle | Charge-/discharge rate in C | Cut-off potential/V upper/lower | Comment |
|---|---|---|---|
| 1-2 | 0.1 | 4.2/3.0 | Formation |
| 3-12 | 1 + 0.5 h constant voltage/current < 0.1 C | 4.2/3.0 | Cycling test |
| 13 | 1 + 0.5 h constant voltage/current < 0.1 C | 4.4/3.0 | Overcharge 4.4 V |
| 14-18 | 1 + 0.5 h constant voltage/current < 0.1 C | 4.2/3.0 | Cycling test |
| 19 | 1 + 0.5 h constant voltage/current < 0.1 C | 4.7/3.0 | Overcharge 4.7 V |
| 20-24 | 1 + 0.5 h constant voltage/current < 0.1 C | 4.2/3.0 | Cycling test |
| 25 | 1 + 0.5 h constant voltage/current < 0.1 C | 5.0/3.0 | Overcharge 5.0 V |
| 26-30 | 1 + 0.5 h constant voltage/current < 0.1 C | 4.2/3.0 | Cycling test |

If the overcharge additive starts to react a plateau can be seen in the voltage vs. time plot of the cycling experiment. The plateau is caused by the oxidative faradic reactions which take place due to the decomposition of the overcharge additive. The voltage value at which the reaction starts is called onset voltage. A higher onset voltage of the overcharge additive enables higher cut off voltages for the battery and consequently higher energy density can be realized.

The decomposition of the overcharge additive leads to a passivation of the electrode and a formation of gas. The formed gas can be used to deactivated the cell by a current interrupt device. A possible passivation of the cell after the overcharge reaction can be seen during the cycling after the overcharge test. The cycling capacity (in cycles 14-18 or 20-24 or 26-30) dramatically decreases after the overcharge reaction. The results of the electrochemical test are shown in Table 4.

The gas formation was measured with a custom made electrochemical cell including a pressure sensor. For the pressure measurements lithium nickel cobalt manganese oxide (NCM 111) electrodes with a capacity of 2 mAh/cm$^2$ and a graphite electrodes with a capacity of 2.15 mAh/cm$^2$ were used. The separator was a glass-fiber filter (Whatmann GF/D), which was soaked with 200 µl of the respective electrolyte composition. For the pressure measurement the test procedure shown in Table 3 was used. The gas formation measured during the overcharge reaction is shown in Table 4.

TABLE 3

| Cycle | Charge-/discharge rate in C | Cut-off potential/V upper/lower | Comment |
| --- | --- | --- | --- |
| 1-3 | 0.1 | 4.2/3.0 | Formation |
| 4-13 | 1 + 0.5 h constant voltage/current < 0.5 C | 4.2/3.0 | Cycling test |
| 13 | 1 + 0.5 h constant voltage/current < 0.5 C | No cut-off +200% Overcharge | |

TABLE 4

| | Onset potential of overcharge protection | Test after over-charge | Pressure Formation |
| --- | --- | --- | --- |
| Example 1 | 4.5 V | Cell deactivated | 0.5 bar |
| Example 2 | 4.8 V | Cell deactivated | Not determined |
| Comparative Example 1 | No Onset up to 5 V | — | |
| Comparative Example 2 | 4.4 V | Cell deactivated | 1.5 bar |

The onset potential of overcharge protection is higher for the inventive composition containing a compound of formula (I) as overcharge protective additive than for the comparative composition containing biphenyl as overcharge protection additive. The comparative composition without overcharge protection additive does not show any overcharge protection up to 5 V.

The invention claimed is:

1. An electrolyte composition comprising at least one compound of formula (I)

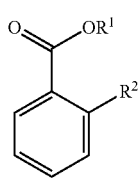

(I)

wherein
$R^1$ represents a $C_1$ to $C_{10}$ alkyl, and
$R^2$ represents a $OC(O)(C_1$ to $C_{10}$ alkyl),
wherein $C_1$ to $C_{10}$ alkyl may be substituted by one or more F atoms, and
wherein one or more $CH_2$-groups of the $C_1$ to $C_{10}$ alkyl which are not bound directly to O may be replaced by O.

2. The electrolyte composition according to claim 1, wherein
$R^1$ represents a $C_1$ to $C_6$ alkyl, and
$R^2$ represents a $OC(O)(C_1$ to $C_6$ alkyl),
wherein the $C_1$ to $C_6$ alkyl may be substituted by one or more F atoms, and
wherein one or more $CH_2$-groups of the $C_1$ to $C_6$ alkyl which are not bound directly to 0 may be replaced by 0.

3. The electrolyte composition according to claim 1, wherein the concentration of the at least one compound of formula (I) in the electrolyte composition is in the range of from 0.1 to 20 wt.-%, based on the total weight of the electrolyte composition.

4. The electrolyte composition according to claim 1, wherein the electrolyte composition contains further comprises at least one further additive.

5. The electrolyte composition according to claim 1, wherein the electrolyte composition further comprises at least one SEI forming additive and/or at least one additional overcharge protection additive.

6. The electrolyte composition according to claim 1, wherein the electrolyte composition further comprises at least one SEI forming additive selected from the group consisting of a vinylene carbonate; a vinylene carbonate derivative; a fluorinated ethylene carbonate; a fluorinated ethylene carbonate derivative; propane sultone; a derivative of propane sultone; ethylene sulfite; a derivative of ethylene sulfite; an oxalate comprising compound; a derivative of an oxalate comprising compound; and an ionic compound comprising a cation of formula (II)

(II)

wherein

X is $CH_2$ or NR', $R^3$ is selected from represents a $C_1$ to $C_6$ alkyl, $R^4$ is selected from represents a $-(CH_2)_u-SO_3-(CH_2)_v-R''$, $-SO_3-$ is $-O-S(O)_2-$ or $-S(O)_2-O-$, u is an integer from 1 to 8 and wherein one or more $CH_2$ groups of the $-(CH_2)_u-$ alkylene chain which are not directly bound to the N-atom and/or the $SO_3$ group may be replaced by O and wherein two adjacent $CH_2$ groups of the $(CH_2)-$ alkylene chain may be replaced by a C—C double bond, v is an integer from 1 to 4, R' represents a $C_1$ to $C_6$ alkyl, R" represents a $C_1$-$C_{20}$ alkyl, $C_2$-$C_{20}$ alkenyl, $C_2$-$C_{20}$ alkynyl, $C_6$-$C_{12}$ aryl, and $C_6$-$C_{24}$ aralkyl, which may comprise one or more F atoms, and wherein one or more $CH_2$ groups of alkyl, alkenyl, alkynyl and aralkyl which are not directly bound to the $SO_3$ group may be replaced by O, and an anion selected from bis(oxalato) borate, di:fluoro (oxalato) borate, $[F_zB(C_mF_{2m+1})_{4-z}]^-$, $[F_yP(C_mF_{2m+1})_{6-y}]^-$, $(C_mF_{2m+1})_2P(O)O]^-$, $[C_mF_{2m+1}P(O)O_2]^{2-}$, $[O-C(O)-C_mF_{2m+1}]^-$, $[O-S(O)_2-C_mF_{2m+1}]^-$, $[N(C(O)-C_mF_{2m+1})_2]^-$, $[N(S(O)_2-C_mF_{2m+1})_2]^-$, $[N(C(O)-C_mF_{2m+1})(S(O)_2-C_mF_{2m+1})]^-$, $[N(C(O)-C_mF_{2m+1})(C(O)F)]^-$, $[(N(S(O)_2-C_mF_{2m+1})(S(O)_2F)]^-$, $[N(S(O)_2F)_2]^-$, $[C(C(O)-C_mF_{2m+1})_3]^-$, $[C(S(O)_2-C_mF_{2m+1})_3]^-$, wherein m is an integer from 1 to 8, z is an integer from 1 to 4, and y is an integer from 1 to 6.

7. The electrolyte composition according to claim 1, wherein the electrolyte composition further comprises an additional overcharge protection additive represented by formula (III)

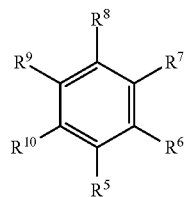

(III)

wherein $R^5$ is cyclohexyl or $C_6$-$C_{12}$ aryl, which may be substituted by one or more substituent selected independently from each other from F, Cl, Br, I, $C_6$-$C_{12}$ aryl, and $C_1$-$C_6$ alkyl, wherein $C_6$-$C_{12}$ aryl and $C_1$-$C_6$ alkyl may be substituted by one or more substituent selected independently from each other from F, Cl, Br and I; and $R^6$, $R^7$, $R^8$, $R^9$ and $R^{10}$ may be same or different and are independently from each other selected from H, F, Cl, Br, I, $C_6$-$C_{12}$ aryl, and $C_1$-$C_6$ alkyl, wherein $C_6$-$C_{12}$ aryl and $C_1$-$C_6$ alkyl may be substituted by one or more substituent selected independently from each other from F, Cl, Br and I.

8. The electrolyte composition according to claim 1, wherein the electrolyte composition further comprises at least one aprotic organic solvent.

9. The electrolyte composition according to claim 1, wherein the electrolyte composition further comprises at least one aprotic organic solvent selected from the group consisting of a cyclic carbonate; an acyclic carbonate; a di-$C_1$-$C_{10}$-alkylether; a di-$C_1$-$C_4$-alkyl-$C_2$-$C_6$-alkylene ether; a di-$C_1$-$C_4$-alkyl-$C_2$-$C_6$-alkylene polyether; a cyclic ether; a cyclic acetal; an acyclic acetal; a cyclic ketal; an acyclic ketal; an orthocarboxylic acids ester; a cyclic ester of a carboxylic acid; an acyclic ester of a carboxylic acid; a cyclic sulfone; an acyclic sulfone; a cyclic nitrile; an acyclic nitrile; a cyclic dinitrile; and an acyclic dinitrile.

10. A method of making an electrolyte composition according to claim 1, the method comprising:
adding at least one compound of formula (I)

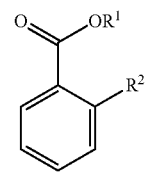

(I)

to a solution comprising a conductive salt and a solvent, wherein $R^1$ represents a $C_1$ to $C_{10}$ alkyl, and $R^2$ represents OC(O)($C_1$ to $C_{10}$ alkyl), wherein the $C_1$ to $C_{10}$ alkyl may be substituted by one or more F atoms, and wherein one or more $CH_2$-groups of the $C_1$ to $C_{10}$ alkyl which are not bound directly to O may be replaced by O.

11. An electrochemical cell comprising the electrolyte composition according to claim 1.

12. The electrochemical cell according to claim 11, wherein the electrochemical cell is a lithium battery.

13. A method of forming a passivating layer on an electrode, the method comprising:
decomposing at least one compound of formula (I)

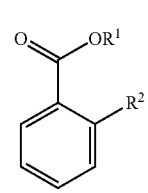

(I)

in the presence of the electrode, the electrode being present in the electrochemical cell, wherein $R^1$ represents a $C_1$ to $C_{10}$ alkyl, and $R^2$ represents a OC(O)($C_1$ to $C_{10}$ alkyl), wherein the $C_1$ to $C_{10}$ alkyl may be substituted by one or more F atoms, and wherein one or more $CH_2$-groups of the $C_1$ to $C_{10}$ alkyl which are not bound directly to O may be replaced by O.

* * * * *